G. A. JORDAN.
HOIST.
APPLICATION FILED NOV. 27, 1909.
987,885.
Patented Mar. 28, 1911.
2 SHEETS—SHEET 2.
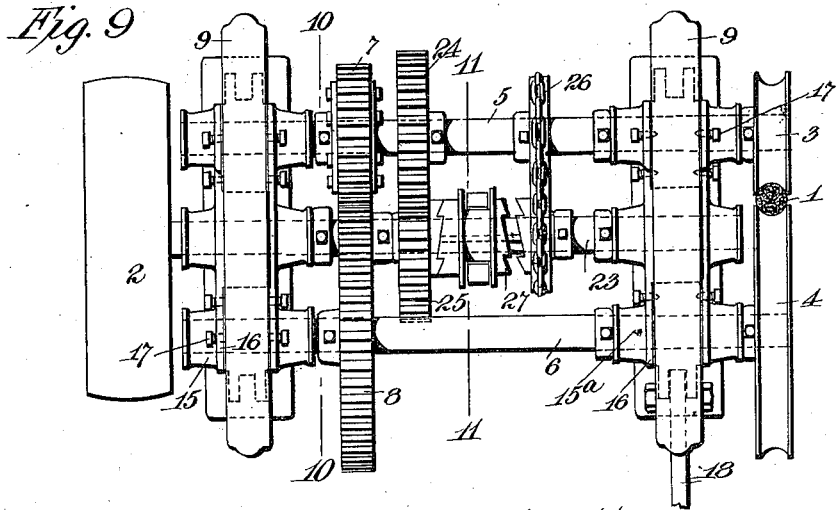
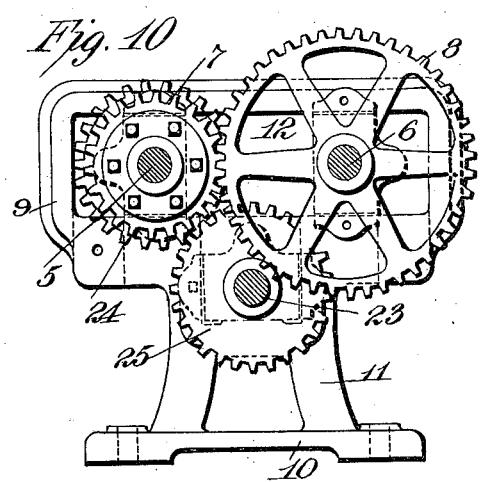
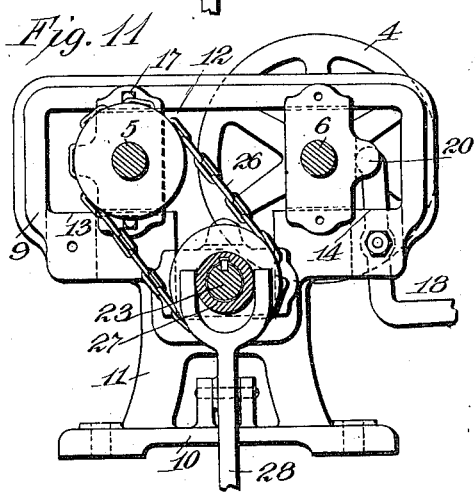
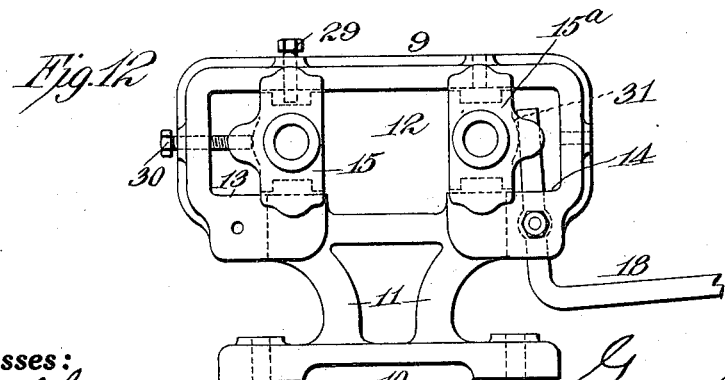
Witnesses:
Inventor
George A. Jordan
Attorneys.

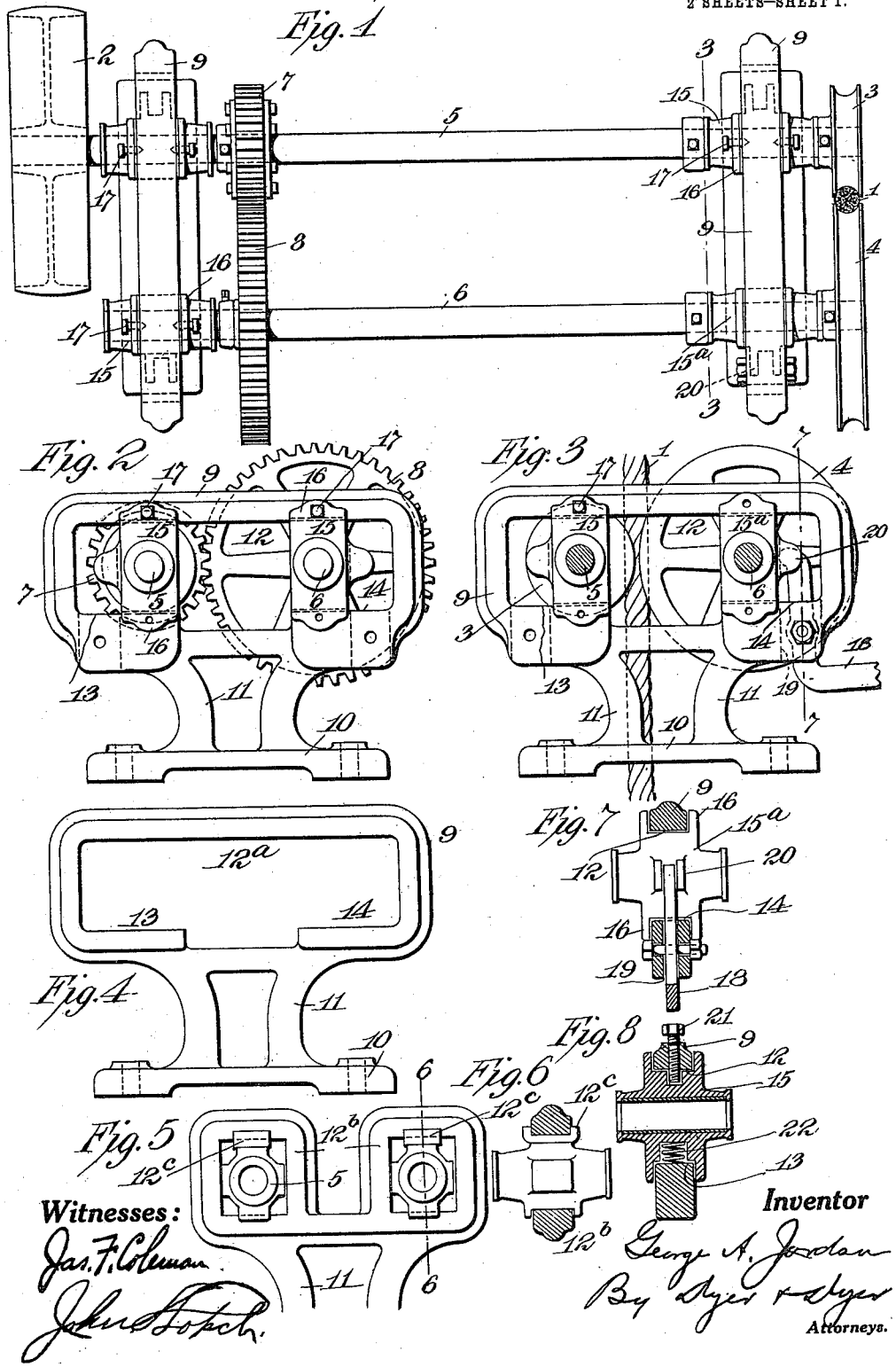

UNITED STATES PATENT OFFICE.

GEORGE A. JORDAN, OF NEW YORK, N. Y., ASSIGNOR OF ONE-THIRD TO WILLIAM H. JORDAN AND ONE-THIRD TO CHRISTOPHER C. JORDAN, OF BROOKLYN, NEW YORK.

HOIST.

987,885.  Specification of Letters Patent.  Patented Mar. 28, 1911.

Application filed November 27, 1909. Serial No. 530,111.

*To all whom it may concern:*

Be it known that I, GEORGE A. JORDAN, a citizen of the United States, residing in the borough of Brooklyn, county of Kings, city and State of New York, have invented a certain new and useful Improvement in Hoists, of which the following is a specification.

The object I have in view is to produce an improvement in hoists used in connection with elevators and the like, by means of which power may be applied to handle objects.

The invention relates to details of construction whereby the apparatus will be simplified and cheapened; also to improvements in the device by means of which the material handled may be moved in both directions.

These and further objects will appear from the following specification and accompanying drawings, considered together or separately.

In the drawings: Figure 1 is a plan view of one form of apparatus embodying my invention; Fig. 2 is an end view with the belt wheel removed; Fig. 3 is a section on the line 3—3 of Fig. 1, looking toward the right; Fig. 4 is a modification of the front frame; Fig. 5 is a second modification of the same; Fig. 6 is a section on the line 6—6 of Fig. 5; Fig. 7 is a section through the line 7—7 of Fig. 3; Fig. 8 is a section of a modified form of bearing; Fig. 9 is a plan view of a modified form of hoist; Fig. 10 is a sectional view on the line 10—10 of Fig. 9; Fig. 11 is a section on the line 11—11 of Fig. 9; and Fig. 12 is an elevation of a modified form of frame and bearings.

In all of the views like parts are designated by the same reference characters.

In the form of structure shown in Figs. 1, 2 and 3, movement is imparted to a rope 1 by means of power applied to a pulley 2. The rope may be gripped between grooved pulleys 3 and 4, which pulleys may be drawn toward one another and the rope pinched between them. The pulley 3 is carried upon a shaft 5 and the pulley 4 is mounted on a shaft 6. The shafts 5 and 6 are provided with gear wheels 7 and 8, which are always in mesh and are located near the ends of the shafts, opposite from the grooved pulleys 3 and 4. The ends of the shafts 5 and 6 which carry the gear wheels 7 and 8 are mounted in bearings which remain at a given distance apart, and the other ends of the shafts are so mounted in bearings that they may be moved toward or away from each other. When these ends of the shafts are separated they are no longer in parallelism, but the separation is not sufficiently great to cause disengagement of the gear wheels 7 and 8.

One feature of the invention resides in the supports or bearings for the shafts 5 and 6. These bearings are supported upon end frames 9. The bearings at both ends of the shafts may be alike (as shown in Figs. 1, 2 and 3). If desired, the front frame (that is the one adjacent to the gears 7 and 8) may be made differently from the other frame in the interest of cheapness and rigidity.

Considering the frame illustrated in Figs. 1, 2 and 3, it will be seen that it has a base 10, legs 11 and a substantially rectangular yoke 12 carried upon the legs. Parallel to and opposite the upper surface of the yoke 12 are two shorter surfaces, 13 and 14. Between the parallel surfaces are mounted bearing blocks 15. These blocks, as shown in Fig. 7, have flanges 16 which extend up on each side of the yoke 12. The blocks are kept from sliding in the yoke 12 by means of bolts or screws 17. In order to change the relative positions of the grooved pulleys 3 and 4 by swinging the shaft 6, one of the bearing blocks—the one supporting one end of shaft 6, indicated at 15$^a$—is not held in position by bolts or screws, but is moved by means of a lever 18, upon which the hand rope (not shown) is attached. This lever passes through a cored opening 19 formed in one of the lower elements, 13 or 14, of the yoke 12, and its upper end bears against the side of a bearing block 15$^a$. For the purpose of insuring that the lever will always remain in contact with the block, the latter is provided with a pair of ears 20 between which the end of the lever works. All of the bearing blocks are best made alike so that they are interchangeable. For the same reason the frames are also made alike.

As illustrated in the modification of the invention shown in Fig. 4, the front frame is provided with a slightly different shaped yoke indicated at 12$^a$. In the yoke 12$^a$ the cored opening 19 may be dispensed with.

Another modification of the invention is illustrated in Figs. 5 and 6, in which each bearing box is supported within a separate yoke, 12$^b$, and retained in position by means of a key 12$^c$, with bent extremities. The support for the end of the shaft 6 at the front is sufficiently loose to allow the shaft to be swerved slightly from parallelism. As shown in Fig. 1, the inner ends of the bolts 17 are pointed and the fit between the flanges 16 and the sides of the yoke 12 is not so close but that the front bearing can be slightly tilted.

In Fig. 8 is shown a modification in which the block is secured in position by means of a bolt 21 introduced from the top. In this view a spring 22 is shown, which will steady the bearing. This spring may be used in connection with the bearings supported in the manner before described, if desired.

Another feature of the invention resides in the means whereby the rope 1 may be moved in either direction. Figs. 9, 10 and 11 illustrate a structure embodying this feature. In addition to the elements already described in connection with Figs. 1, 2 and 3, a third shaft 23 carrying the pulley 2 is mounted in bearings in the bases of the frames, as shown. The shaft 23 is connected to the shaft 5 by reversing gearing which comprises a gear 24 secured to the shaft 5, a gear 25 rotatable on the shaft 23, a sprocket wheel secured to the shaft 5, another sprocket wheel rotatable on the shaft 23, a chain 26 connecting said sprocket wheels, a movable clutch element 27 rotatable with but slidable on the shaft 23 and arranged to engage with complementary clutch elements on the faces of the gear 25 and the sprocket wheel mounted on the shaft 23, and the forked lever 28 by which the clutch element 27 can be thrown from one extreme position to the other. With this arrangement it is obvious that the shaft 5 can be driven in either direction from the shaft 23 carrying the pulley 2, thereby making the rope 1 move in either direction between the pulleys 3 and 4. It is apparent that by this construction the shaft 5 may be turned in either direction, while the pulley 2 continues to rotate in one direction.

In Fig. 12 is illustrated a modification in which the two bearing boxes in a frame may be adjusted in relation to one another. The box 15 for the bearing of the shaft 5 is immovably held in position by means of a set screw 29, which engages with a slot in the top of the box, thus allowing adjustment. A screw 30 at the side serves to adjust the box in lateral position and resists the pressure exerted by the lever 18 and transmitted from the movable shaft to the stationary shaft through the rope 1. The end of the lever 18 bears against a curved protuberance 31 on the box 15$^a$, thus always insuring contact with the center of the box. By means of the structure illustrated in Fig. 12, the two boxes may be made alike as in the other arrangement previously described.

The rope 1 in all embodiments of the invention is adapted to be led to the load, either directly or indirectly, through the intermediary of a hoist or elevator. In the latter situation the rope 1 may be the twisting rope ordinarily designed to be operated by hand.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent is:

1. A hoist comprising two shafts, grooved pulleys on said shafts near one end thereof coöperating to grip a rope between them, end frames provided with yoke portions having flat parallel horizontal surfaces, journal boxes for such shafts supported in said yokes between said flat surfaces, means for adjustably holding in fixed position the boxes in that frame farthest from the grooved pulleys, means coöperating with that frame adjacent the grooved pulleys for holding one of said boxes fixed, and a lever pivoted in the last mentioned frame and coöperating with the unfixed box therein for forcing said box toward the other box in that frame, and gearing for connecting said shafts and causing them to rotate in different directions.

2. A hoist comprising two shafts, grooved pulleys on said shafts near one end coöperating to grip a rope between them, end frames, journal boxes for said shafts supported in said frames the boxes in one frame being fixed and the boxes in the other frame adjacent the grooved pulleys being one fixed and the other movable, a lever pivoted in said last mentioned frame and coöperating with said movable box for forcing it toward the other box in that frame, gearing for connecting said shafts and causing them to rotate in different directions, a third shaft journaled in said frames, and reversing gearing between said third shaft and one of the first mentioned shafts.

This specification signed and witnessed this 22 day of Nov., 1909.

GEORGE A. JORDAN.

Witnesses:
Wm. H. Jordan,
Jas. F. Coleman.